(12) United States Patent
Tsao et al.

(10) Patent No.: US 9,027,012 B2
(45) Date of Patent: May 5, 2015

(54) MANUFACTURING SYSTEM AND FIRMWARE BURNING METHOD

(75) Inventors: Wen-Chun Tsao, New Taipei (TW); Shih-Yuan Wang, New Taipei (TW)

(73) Assignee: Wistron Corporation, New Taipei (TW)

( * ) Notice: Subject to any disclaimer, the term of this patent is extended or adjusted under 35 U.S.C. 154(b) by 439 days.

(21) Appl. No.: 13/444,264

(22) Filed: Apr. 11, 2012

(65) Prior Publication Data
US 2013/0159986 A1    Jun. 20, 2013

(30) Foreign Application Priority Data
Dec. 20, 2011 (TW) .............................. 100147518 A

(51) Int. Cl.
*G06F 9/44*    (2006.01)
*G06F 9/445*    (2006.01)

(52) U.S. Cl.
CPC ........................................ *G06F 8/66* (2013.01)

(58) Field of Classification Search
None
See application file for complete search history.

(56) References Cited

U.S. PATENT DOCUMENTS

| | | | |
|---|---|---|---|
| 7,669,195 B1* | 2/2010 | Qumei | 717/170 |
| 8,307,356 B2* | 11/2012 | Klopfer et al. | 717/173 |
| 8,495,618 B1* | 7/2013 | Inbaraj et al. | 717/173 |
| 2003/0106051 A1* | 6/2003 | Morrison et al. | 717/170 |
| 2003/0236970 A1* | 12/2003 | Palmer et al. | 713/1 |
| 2004/0143828 A1* | 7/2004 | Liu et al. | 717/168 |
| 2006/0136900 A1* | 6/2006 | Kim et al. | 717/168 |
| 2006/0225069 A1* | 10/2006 | Yuuki | 717/170 |
| 2007/0169098 A1* | 7/2007 | Kikuchi | 717/168 |
| 2008/0288936 A1* | 11/2008 | Ikeda | 717/173 |
| 2009/0222650 A1 | 9/2009 | Chen | |
| 2011/0093741 A1 | 4/2011 | Liang et al. | |

FOREIGN PATENT DOCUMENTS

| | | |
|---|---|---|
| TW | 200937290 A | 9/2009 |
| TW | 201113704 A1 | 4/2011 |

OTHER PUBLICATIONS

Abrahamsson, David. Security Enhanced Firmware Update Procedures in Embedded Systems, 2008, Retrieved on [Jan. 22, 2015] Retrieved from the Internet: URL< http://www.diva-portal.org/smash/get/diva2:174606/FULLTEXT01.pdf>.*

(Continued)

*Primary Examiner* — Thuy Dao
*Assistant Examiner* — Cheneca Smith
(74) *Attorney, Agent, or Firm* — McClure, Qualey & Rodack, LLP

(57) ABSTRACT

A firmware burning method applied in a target device, which includes a storage unit, a target circuit, and a peripheral controller, connected to the storage circuit via a first communication link, is provided. The method include steps of: providing a test fixture having a first node, a second node, and a switch circuit connected across the first and second nodes, the first and second nodes being respectively coupled to the storage circuit and the target circuit; determining whether firmware of the target circuit satisfies a condition; if not, providing a second communication link between the target circuit and the storage circuit via the first and second nodes by turning on the switch circuit, and switching the peripheral controller to a disabled state; and updating the firmware of the target circuit according to to-be-burned firmware stored in the storage circuit via the second communication link.

9 Claims, 4 Drawing Sheets

(56) References Cited

OTHER PUBLICATIONS

Zou et al.Co-design for an SoC embedded network controller. Science A, Apr. 2006, pp. 591-596, Retrieved on [Jan. 22, 2015] Retrieved from the Internet: URL <http://download.springer.com/static/pdf/708/art%253A10.1631%252Fjzus.2006.A0591.pdf?auth66=1421948233_69d89d082e0d4a2ab1f9368fd9544e75&ext=.pdf>.*
TW Office Action dated Apr. 3, 2014.
Partial translation of TW Office Action dated Apr. 3, 2014.

* cited by examiner

MANUFACTURING SYSTEM AND FIRMWARE BURNING METHOD

This application claims the benefit of Taiwan application Serial No. 100147518, filed Dec. 20, 2011, the subject matter of which is incorporated herein by reference.

BACKGROUND OF THE INVENTION

1. Field of the Invention

The invention relates in general to a manufacturing system and a firmware burning method thereof, and more particularly to a manufacturing system capable of concurrently burning firmware during a hardware manufacturing process and a firmware burning method thereof.

2. Description of the Related Art

In the current world where the technology continuously progresses, integrated circuits prevail in various electronic products. For example, an integrated circuit is generally provided with a firmware unit, e.g., an embedded flash memory, for storing firmware required for operations of the integrated circuit. In a current technique, a firmware burning operation of an integrated circuit may be selectively exercised by an integrated circuit manufacturer before delivering the integrated circuit to a system manufacturer, or by a system manufacturer after delivering the integrated circuit.

However, when the firmware burning operation is handled by an integrated circuit manufacturer, a system manufacturer may encounter issues of the system manufacturer mixing the firmware with other firmware or firmware incompatibility among different projects. On the other hand, when the firmware burning operation is handled by a system manufacturer, the system manufacturer is also faced with problems of costs of firmware burning fixture acquisition and time. Therefore, there is a need for a more ideal solution for firmware burning of an integrated circuit having a firmware storage unit.

SUMMARY OF THE INVENTION

According to an aspect of the present invention, a manufacturing system including a target device and a test fixture is provided. The target device includes a storage circuit, a target circuit and a peripheral controller. The storage circuit stores a setting code and to-be-burned firmware. The target circuit determines whether firmware of the target circuit satisfies a condition, and enables a control signal when the condition is not satisfied. The peripheral controller, connected to the storage circuit via a first communication link, switches to a disabled state in response to the control signal. The test fixture includes a first node, a second node and a switch circuit. The first and second nodes are respectively coupled to the storage circuit and the target circuit. The switch circuit, connected across the first and second nodes, is turned on in response to the enable state of the control signal to form a second communication link for connecting the target circuit and the storage circuit via the first and second nodes. After providing the control signal, the target circuit further accesses the storage circuit via the second communication link to update the firmware according to the to-be-burned firmware.

According to another aspect of the present invention, a firmware burning method applied in a target device is provided. The target device includes a storage unit, a target circuit, and a peripheral controller that is connected to the storage circuit via a first communication link. The method include steps of: providing a test fixture having a first node, a second node, and a switch circuit connected across the first and second nodes, the first and second nodes being respectively coupled to the storage circuit and the target circuit; determining whether firmware of the target circuit satisfies a condition; if not, providing a second communication link between the target circuit and the storage circuit via the first and second nodes by turning on the switch circuit, and switching the peripheral controller to a disabled state; and updating the firmware of the target circuit according to to-be-burned firmware stored in the storage circuit via the second communication link.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
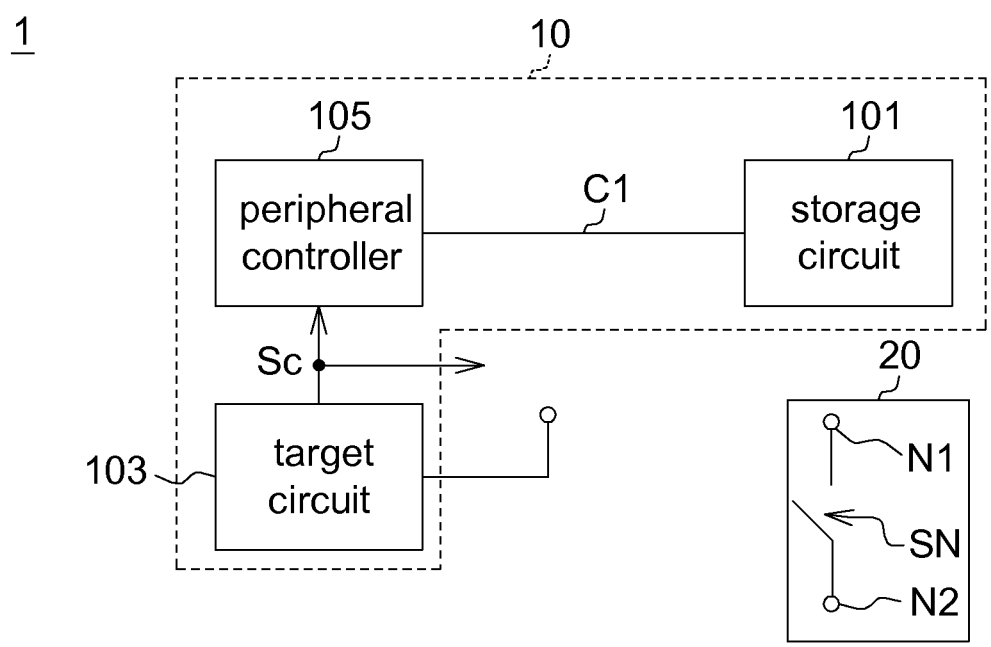
FIG. 1 is a block diagram of a manufacturing system according to one embodiment of the present invention.

FIG. 1 shows a block diagram of a manufacturing system according to one embodiment of the present invention. A manufacturing system 1 includes a target device 10. The target device 10 includes a storage circuit 101, a target circuit 103 and a peripheral controller 105. The peripheral controller 105 is connected to the storage circuit 101 via a communication link C1. For example, the communication link C1 is a Serial Peripheral Interface (SPI) compliant interface.

For example, the target device 10 is a motherboard of a notebook computer, and the target circuit 103 and the peripheral controller 105 are respectively an embedded controller (CE) and a south-bridge chip in the motherboard. The storage circuit 101 is an SPI read-only memory (ROM) for storing basic codes of the south-bridge chip, and is for storing a basic input/output system (BIOS) code corresponding to the south-bridge chip. The storage circuit 101 further stores to-be-burned firmware corresponding to the target circuit 103.

According to current firmware, the target circuit 103 exercises a firmware burning method according to one embodiment, so as to perform a firmware burning operation of the target circuit 103.

Figure 2:
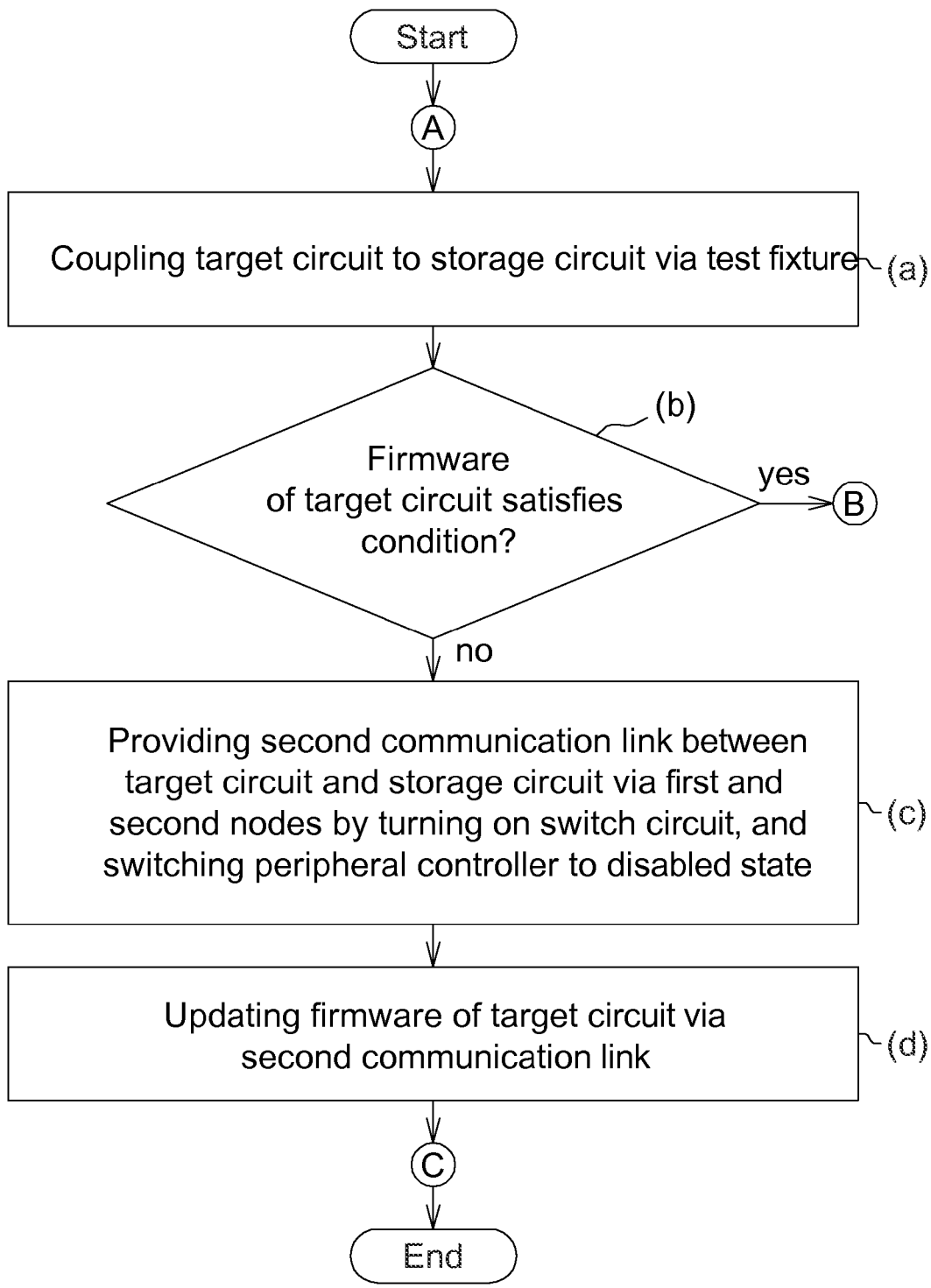
FIG. 2 is a flowchart of a firmware burning method according to one embodiment of the present invention.

FIG. 2 shows a flowchart of a firmware burning method according to one embodiment of the present invention. Steps of the method are to be described below. In Step (a), the target circuit 103 is coupled to the storage circuit 101 via a test fixture 20. The test fixture 20 includes a node N1, a node N2 and a switch circuit SW. The switch circuit SW is connected across the nodes N1 and N2, and the nodes N1 and N2 are respectively coupled to the storage circuit 101 and the target circuit 103.

In one embodiment, the test fixture 20 is an auto function test equipment for testing peripheral input/output ports of the target device 10. Taking a motherboard of a notebook computer as the target device 10 for example, the test fixture 20 includes several peripheral bus test units respectively corresponding to the peripheral input/output ports of the target device 10. During a test operation, a central processor and a RAM as well as the test fixture 20 are disposed on the target device 10, such that the peripheral bus test units of the test fixture 20 are respectively coupled with the peripheral input/output ports of the target device 10. Accordingly, through the peripheral bus test units of the test fixture 20, a user is allowed to carry out function tests on the peripheral input/output ports of the target device 10.

Figure 3:
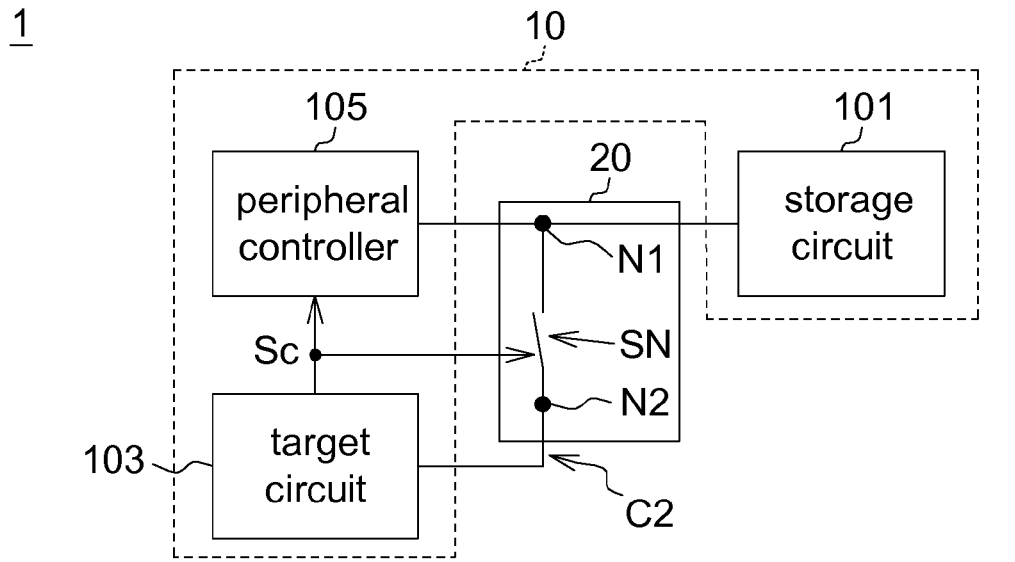
FIG. 3 is a block diagram of a manufacturing system according to another embodiment of the present invention.

Further, wirings between the nodes N1 and N2 of the test fixture 20 and the corresponding storage circuit 101 and the target circuit 103 is a spatial mapping relationship. Thus, when the test fixture 20 is disposed on the target device 10, the nodes N1 and N2 of the test fixture 20 are respectively coupled to the storage circuit 101 and the target circuit 103 via physical paths such as thimbles, jumper wires or switches. FIG. 3 shows a block diagram of the manufacturing system 1.

In Step (b), the target circuit 103 determines whether the firmware of the target circuit 103 satisfies a condition. When the condition is not satisfied, Step (c) is performed in which the target circuit 103 provides an control signal Sc. The control signal Sc correspondingly turns on the switch circuit SW to form a communication link C2 between the target circuit 103 and the storage circuit 101 via the node N1, the switch SW and the node N2. The control signal Sc further controls the peripheral controller 105 to switch to a disabled state, such that a connection point of the peripheral controller 105 and the communication link C1 is in high impedance.

For example, the condition is whether a checksum of the current firmware of the target circuit 103 equals a predetermined value. When the checksum of the current firmware does not equal to the predetermined value, it means that firmware burning for the target circuit 103 is yet incomplete, and the current firmware is a factory default version, for example.

In Step (d), via the communication link C2 formed through the node N1, the switch SW and the node N2, the target circuit 103 accesses the storage circuit 101 and updates firmware according to the to-be-burned firmware.

Figure 4:
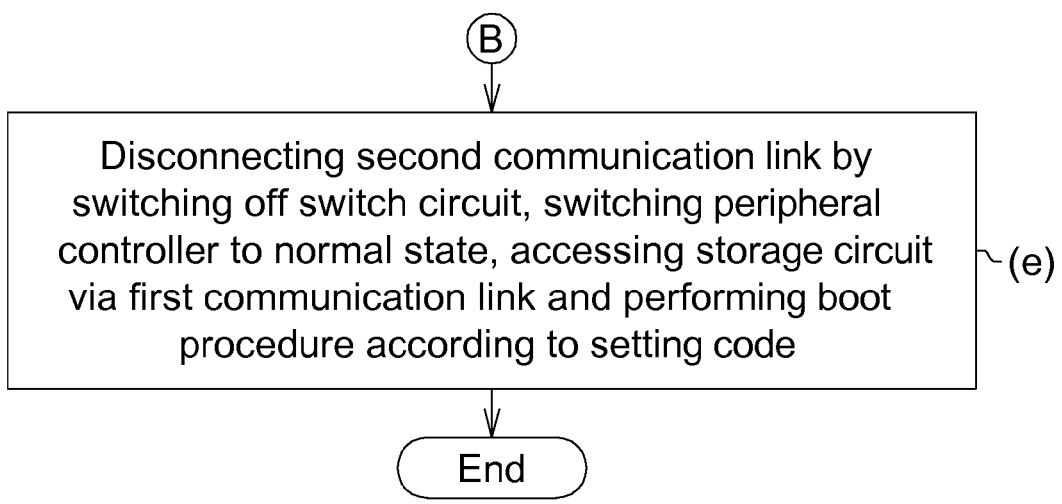
FIG. 4 is a detailed flowchart of the firmware burning method in FIG. 2.

FIG. 4 shows a detailed flowchart of the firmware burning method in FIG. 2. Conversely, when the firmware in the target circuit 103 satisfies the condition (e.g., when the checksum of the current firmware in the target circuit 103 equals the predetermined value), it means that firmware burning in the target circuit 103 is completed in previous operations. The firmware burning method according to the embodiment then proceeds to Step (e), in which the target circuit 103 provides a control signal Sc to turn off the switch circuit SW and to correspondingly disconnect the communication link C2. Further, the control signal Sc also drives the peripheral controller 105 to switch to a normal state, so as to allow the peripheral controller 105 to the storage circuit 101 via the communication link C1 and to perform a normal boot procedure according to a setting code in the storage circuit 101.

In conclusion, at the time when the auto function test equipment is implemented to perform function tests on the peripheral input/output ports of the target device 10, the manufacturing system 1 according to the embodiment further determines whether firmware burning in the target circuit 103 is completed via the target circuit 103. When the firmware burning in the target circuit 103 is not yet completed, the target circuit 103 provides the control signal Sc in an enable state to correspondingly switch the peripheral controller 105 to a disabled state, and enables the communication link C2 provided by the test fixture 20 to update the firmware according to the to-be-burned firmware in the storage circuit 101. Conversely, when the firmware burning in the target circuit 103 is completed, the target circuit 103 provides a control signal Sc in a disable state to correspondingly switch the peripheral controller 105 to a normal state, and disconnects the communication link C2 between the target circuit 103 and the storage circuit 101. Therefore, the manufacturing system 1 according to the embodiment stores the firmware of the target circuit 103 in the storage circuit 101 corresponding to the peripheral controller 105, and at the same time performs the firmware burning operation of the target circuit 103 when testing the peripheral input/output ports.

Figure 5:
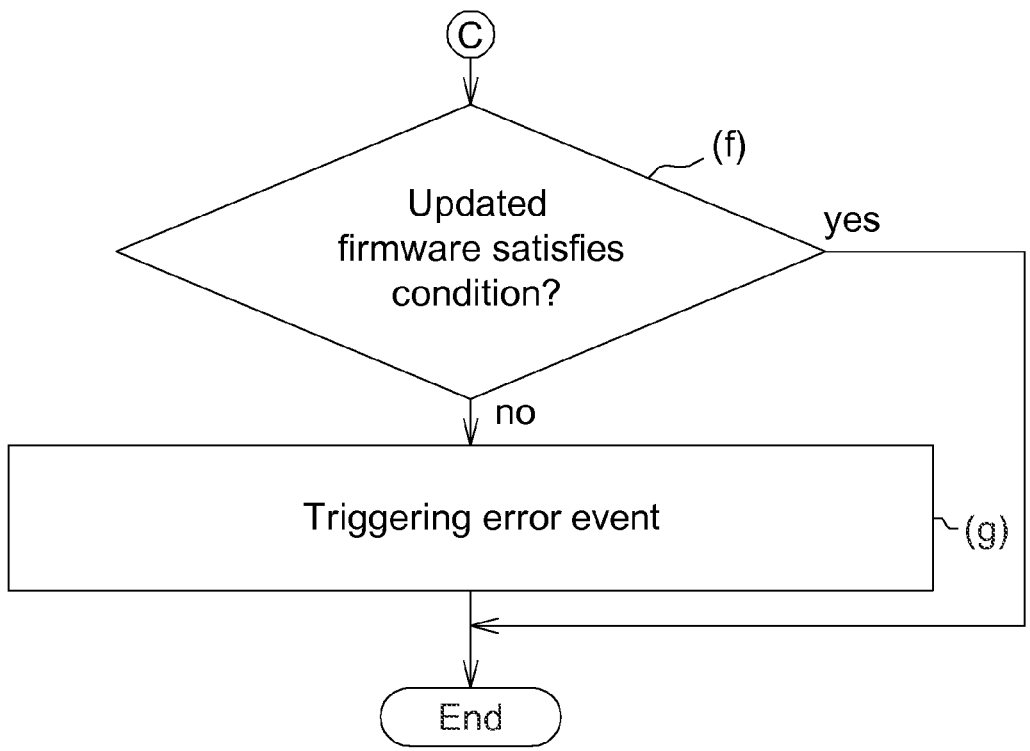
FIG. 5 is another detailed flowchart of the firmware burning method in FIG. 2.

FIG. 5 shows a detailed flowchart of the firmware burning method in FIG. 2. For example, the firmware burning method according to this embodiment further includes Step (f) after Step (d). In Step (f), the target circuit 103 again determines whether the updated firmware satisfies the condition. When the condition is satisfied, the firmware burning method according to the embodiment ends. Conversely, when the updated firmware of the target circuit 103 does not satisfy the condition, the firmware burning method according to the embodiment proceeds to Step (g). In Step (g), the target circuit 103 triggers an error event to inform a user of a firmware burning failure in the target circuit 103.

Figure 6:
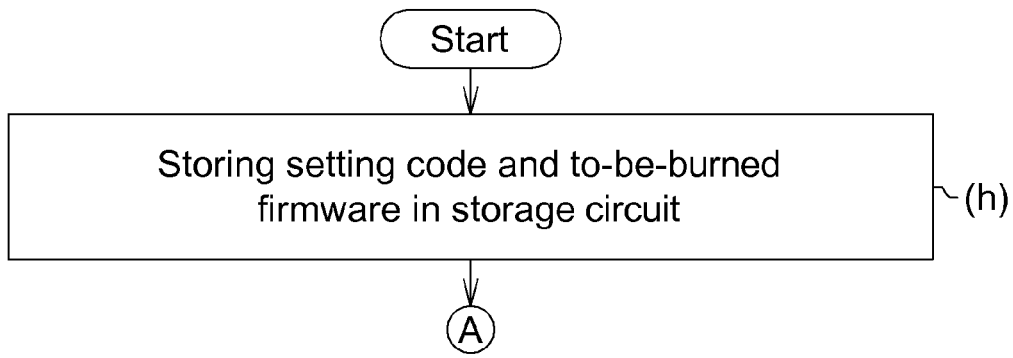
FIG. 6 is yet another detailed flowchart of the firmware burning method in FIG. 2.

FIG. 6 shows a detailed flowchart of the firmware burning method in FIG. 2. For example, before Step (a), the firmware burning method according to this embodiment further includes Step (h). In Step (h), the storage circuit 101 is programmed to concurrently store the setting code and the to-be-burned firmware.

In conclusion, the manufacturing system according to the embodiment includes the target device and the test fixture. The target device includes the storage circuit, the target circuit and the peripheral controller. The storage circuit is for storing the to-be-burned firmware for the target circuit and the setting code of the peripheral controller. In response to a power-on event, the target circuit is enabled and determines whether the firmware of the target circuit satisfies the condition. When the condition is not satisfied, the target circuit enables the control signal to switch the peripheral controller to a disabled state. The test fixture includes the first and second nodes and the switch circuit. In response to a user operation, the test fixture is disposed on the target device, such that the first and second nodes are respectively coupled to the storage circuit and the target circuit. The switch circuit is connected across the first and the second nodes, and forms a communication link between the target circuit and the storage circuit. Accordingly, the target circuit is allowed to correspondingly access the storage circuit and to update the firmware according to the to-be-burned firmware. In other words, during the manufacturing process of the target device, the manufacturing system according to the embodiment is capable of selectively providing the communication link between the target circuit and the storage circuit by use of the test fixture, and performs the firmware burning operation on the target circuit according to the to-be-burned firmware in the storage circuit. Accordingly, compared to a conventional firmware burning method, the manufacturing system and the firmware burning method according to the embodiment offer advantages of reduced firmware burning work time and costs.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A firmware burning method: the method comprising:
   a) providing a target device, comprising: a storage circuit, for storing a setting code and to-be-burned firmware, a target circuit, for determining whether firmware of the target circuit satisfies a condition, and enables a control signal when the firmware does not satisfy the condition, and a peripheral controller, connected to the storage circuit via a first communication link, being switched to a disabled state in response to an enable state of the control signal;
   b) providing a test fixture, the test fixture comprising a first node, a second node and a switch circuit, the switch circuit being connected across the first and second nodes, the first and second nodes being respectively coupled to the storage circuit and the target circuit;
   c) determining whether firmware of the target circuit satisfies a condition;
   d) when the firmware does not satisfy the condition, providing a second communication link between the target circuit and the storage circuit via the first and second nodes by turning on the switch circuit, and switching the peripheral controller to a disabled state; and
   d) updating the firmware according to to-be-burned firmware in the storage circuit via the second communication link.

2. The firmware burning method according to claim 1, further comprising:
   e) when the firmware satisfies the condition, disconnecting the second communication link between the target circuit and the storage circuit by turning off the switch circuit, switching the peripheral controller to a normal state, accessing the storage circuit and performing a boot procedure according to a setting code in the storage circuit.

3. The manufacturing burning method according to claim 2, after Step (e), further comprising:
   f) determining whether the updated firmware satisfies the condition; and
   g) when the updated firmware does not satisfy the condition, triggering an error event.

4. The manufacturing burning method according to claim 2, before Step (a), further comprising:
   h) storing a setting code and the to-be-burned firmware in the storage circuit.

5. A manufacturing system, comprising:
   a target device, comprising:
   a storage circuit, for storing a setting code and to-be-burned firmware;
   a target circuit, for determining whether firmware of the target circuit satisfies a condition, and enables a control signal when the firmware does not satisfy the condition; and
   a peripheral controller, connected to the storage circuit via a first communication link, being switched to a disabled state in response to an enable state of the control signal; and
   a test fixture, comprising:
   a first node and a second node, respectively coupled to the storage circuit and the target circuit; and
   a switch circuit, connected across the first and second nodes, being turned on in response to the enable state of the control signal to form a second communication link between the target circuit and the storage circuit via the first and second nodes;
   wherein, after providing the control signal, the target circuit further accesses the storage circuit via the second communication link and updates the firmware according to the to-be-burned firmware.

6. The manufacturing system according to claim 5, wherein when the firmware satisfies the condition, the target circuit disables the control signal, and the switch circuit disconnects the second communication link between the target circuit and the storage circuit in response to a disable state of the control signal.

7. The manufacturing system according to claim 6, wherein in response to the disable state of the control signal, the peripheral controller switches to a normal state and accesses the storage circuit via the first communication link and performs a boot procedure according to the setting code.

8. The manufacturing system according to claim 5, wherein after updating the firmware, the target circuit further determines whether the updated firmware satisfies the condition, and disables the control signal when the updated firmware satisfies the condition.

9. The manufacturing system according to claim 8, wherein the target circuit triggers an error event when the updated firmware does not satisfy the condition.

* * * * *